United States Patent [19]

Kawano et al.

[11] Patent Number: 4,914,456

[45] Date of Patent: Apr. 3, 1990

[54] ELECTROSTATOGRAPHIC APPARATUS

[75] Inventors: Yuzo Kawano, Oonojyou; Katsumi Ogawa, Fukuoka; Tatsuya Tokoshima, Mii; Hiroshi Fujiwara, Fukuoka, all of Japan

[73] Assignee: Matsushita Electric Industrial Co., Ltd., Kadoma, Japan

[21] Appl. No.: 260,999

[22] Filed: Oct. 21, 1988

[30] Foreign Application Priority Data

Oct. 23, 1987 [JP] Japan ................................ 62-268567
Oct. 23, 1987 [JP] Japan ................................ 62-268568

[51] Int. Cl.[4] ........................................ G01D 15/00
[52] U.S. Cl. .................................. 346/154; 346/160.1
[58] Field of Search ..................... 346/154, 160, 160.1, 346/153.1; 355/3 CH, 3 DD; 358/300

[56] References Cited

U.S. PATENT DOCUMENTS 4,763,143 8/1988 Ohba et al. ........................ 346/153.1
4,799,071 1/1989 Zeise et al. .......................... 346/160

FOREIGN PATENT DOCUMENTS 59-228263 12/1984 Japan .................................. 346/154
59-228267 12/1984 Japan .................................. 346/154

*Primary Examiner*—Arthur G. Evans
*Attorney, Agent, or Firm*—Cushman, Darby & Cushman

[57] ABSTRACT

The present invention provides an electrostatographic apparatus having a control circuit (35) which controls an optical unit (5) to scan a photoconductor (1) during a predetermined time period with laser beam lit irrespective of recording signals after stoppage of power supply from a power source (34) to a charger (2) and a developer (7), thereby lowering potential on a surface of the photoconductor (1) after the stoppage of power supply.

3 Claims, 5 Drawing Sheets

ELECTROSTATOGRAPHIC APPARATUS

FIELD OF THE INVENTION AND RELATED ART STATEMENT

1. FIELD OF THE INVENTION

The present invention relates to an electrostatographic apparatus which develops electrostatic latent images formed on a surface of a photoconductor with toner particles and transcribes and fixes the developed toner images on a paper.

2. DESCRIPTION OF THE RELATED ART

In the well-known conventional electrostatographic apparatus, when a malfunction such as paper jam occurs and results in stoppage of recording, the electrostatographic apparatus operates through the following procedure. Firstly, a charger and a developer stop operations thereof. Secondly, a recording medium such as a paper is ejected out of the electrostatographic apparatus, and finally, carrying means stops operation thereof. In the ordinary type of the electrostatographic apparatus, the cylindrical photoconductor and the carrying means are generally driven by a single common driving source. Therefore, even when recording is stopped, the photoconductor maintains to rotate until the carrying means stops.

FIG. 5 is an internal side view, partly in cross section, of the electrostatographic apparatus. A charger 2, which has therein a charging wire 3 made of tungsten and a grid 4, is disposed adjacent to a circumference of a photoconductor 1. High voltage is impressed on the charging wire 3, thereby to induce electric charge on the photoconductor 1. Laser beam which is emitted out of an optical unit 5 flickers by modulation responding to recording signals supplied from a host computer (not shown) and scans the photoconductor, thereby forming electrostatic latent images. The electrostatic latent images are developed by a developer 7. Toner particles 8 are stored in a hopper 9. Carrier particles 10, which is made of e.g. steel, and sleeves 11 are provided to carry the toner particles 8 toward the photoconductor 1. A developing vat 12 generates magnetic brush. A sponge-roller 13 transfers the toner particles 8 from the hopper 9 to the developing vat 12. A paddle 14 stirs the toner particles 8 within the developer 7, thereby to prevent what is called blocking which is caused by a lump of the toner particles 8. The paddle 14 also supplies the toner particles 8 to the sponge-roller 13 and rotates together with the sponge-roller 13, thereby to supply a predetermined amount of the toner particles 8 to the developing vat 12. A mixer 16 mixes the supplied toner particles 8 and the carrier particles 10, and carries the mixed particles onto the sleeve 11. A magnet roller 17 has permanent magnets 18 arranged thereon. The magnetic brush contains the toner particles 8 and the carrier particles 10, which are carried by the mixer 16, and is formed by the permanent magnets 18 like a brush. A trimmer blade 19 limits height of the magnetic brush. The magnetic brush touches the photoconductor 1 and fits the toner particles 8 on the electrostatic latent image formed on the photoconductor 1, thereby forming a powder-like picture image. A scraper 20 removes the toner particles 8 and the carrier particles 10, which are fitted on the sleeve 11, from the sleeve 11 and drops them on the mixer 16 in the developing vat 12. A paper 22, which is stocked in a cassette case 23, is carried to the photoconductor 1 by a carrying roller 24. Since the carrying roller 24 and the photoconductor 1 are driven by the same driving source, they are mutually synchronized to carry the paper 22. The powder-like picture image, which is formed on the photoconductor 1 by impressing high voltage, is transcribed onto the paper 22 by a transcriber 25. The transcribed powder-like picture image is heat-fixed by a fixer 25. The paper 22 whereon the fixed picture image is formed is ejected onto a tray 26. After transcription, a cleaner 27 scrapes the toner 8 remaining on the photoconductor 1. An eraser 28 erases the electric charge remaining on the photoconductor 1. The cleaner 27 and the eraser 28 are provided in order to make a surface of the photoconductor 1 to be the initial state where no toner particles 8 and no electric charge exist on the photoconductor 1.

FIG. 6 is also an internal side view, partly in cross section, of the electrostatographic apparatus in an open state thereof. An upper frame 29 holds the photoconductor 1, the optical unit 5, the charger 2, the developer 7, the cleaner 27 and the eraser 28 etc. thereon. A lower frame 30 holds the fixer 25 etc. A paper guide 31 are provided to guide the paper 22. The upper frame 29 is rotatably held on the lower frame 30 around a shaft 32, thereby to easily take out the paper 22 which causes jam. Control circuit for controlling the optical unit 5, the charger 2, the developer 7, the cleaner 27, the eraser 28 and the fixer 25 etc. is formed on a substrate 33.

FIG. 7 is a block diagram showing the above-mentioned electrostatographic apparatus. In the figure, power for the charger 2 and the developer 7 is supplied by a power source 34. It is advantageous for saving cost to commonly use only one power source 34. The magnetic brush 37 is formed within an area shown by slanted lines between the photoconductor 1 and the sleeve 11.

When the paper 22 causes jam somewhere in the carrying means such as the carrying roller 24, the optical unit 5 stops scanning of laser beam. Simultaneously, the power source 34 stops supplying of current, thereby stopping operations of the charger 2 and the developer 7. Subsequently, the photoconductor 1 and the carrying roller 24 eject the paper 22, which is still under recording, onto the tray 26. Thereafter, the photoconductor 1 and the carrying roller 24 stop rotations thereof.

In the above-mentioned electrostatographic apparatus, when the jam occurs, power supply to the charger 2 and the developer 7 stop simultaneously, whereas the photoconductor 1 keeps on rotating during a predetermined time period. Therefore, a part of the photoconductor, whereto electric charges are given before stoppage of power supply, moves toward the developer 7 by rotation of the photoconductor 1. FIG. 8 is a graph showing time charts of potential of the developer 7 and a surface of the photoconductor 1. During the aforementioned predetermined time period, namely during a time period $T_1$ in FIG. 8, difference between bias voltage $V_B$ of the developer 7 and potential $V_S$ on the surface of the photoconductor 1 under the developer 7 is very large. At that time, a small amount of toner particles 8, which is charged with positive potential, are attached to the surface of the photoconductor 1 and fitted thereon. Consequently, consumption of the toner particles 8 or excluded amount of the toner particles 8 increase, and the carrier particles 10 may be scattered away from the sleeve 11.

OBJECT AND SUMMARY OF THE INVENTION

The object of the present invention is to offer an electrostatographic apparatus which can prevent undesirable increase of consumption of the toner particles and scattering of the carrier particles 10 away from the sleeve 11.

In order to achieve the above-mentioned object, the electrostatographic apparatus in accordance with the present invention comprises:

a photoconductor;

a charger disposed adjacent to a circumference of the photoconductor;

a laser unit for emitting laser beam to scan a surface of the photoconductor in response to recording signals and forming latent image on the surface which has been charged by the charger;

a developer for developing the latent image;

a power source for supplying power to the charger and the developer; and control means for controlling the laser unit to scan the photoconductor during a predetermined time period with laser beam lit irrespective of the recording signals after stoppage of power supply from the power source to the charger and the developer.

In the above-mentioned electrostatographic apparatus, potential on a surface of the photoconductor is lowered by emitting laser beam thereon even after stoppage of power supply to the charger and the developer. Difference between the potential on the surface of the photoconductor and the potential of the developer is thereby small. Consequently, toner particles which are charged with positive potential are not attracted to the surface of the photoconductor. And thereby, undesirable increase of consumption and increase of excluded amount of the toner particles are prevented, and the carrier particles do not scatter away from the sleeve.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, preferred embodiments of the present invention are described with reference to the accompanying drawings.

Figure 5:
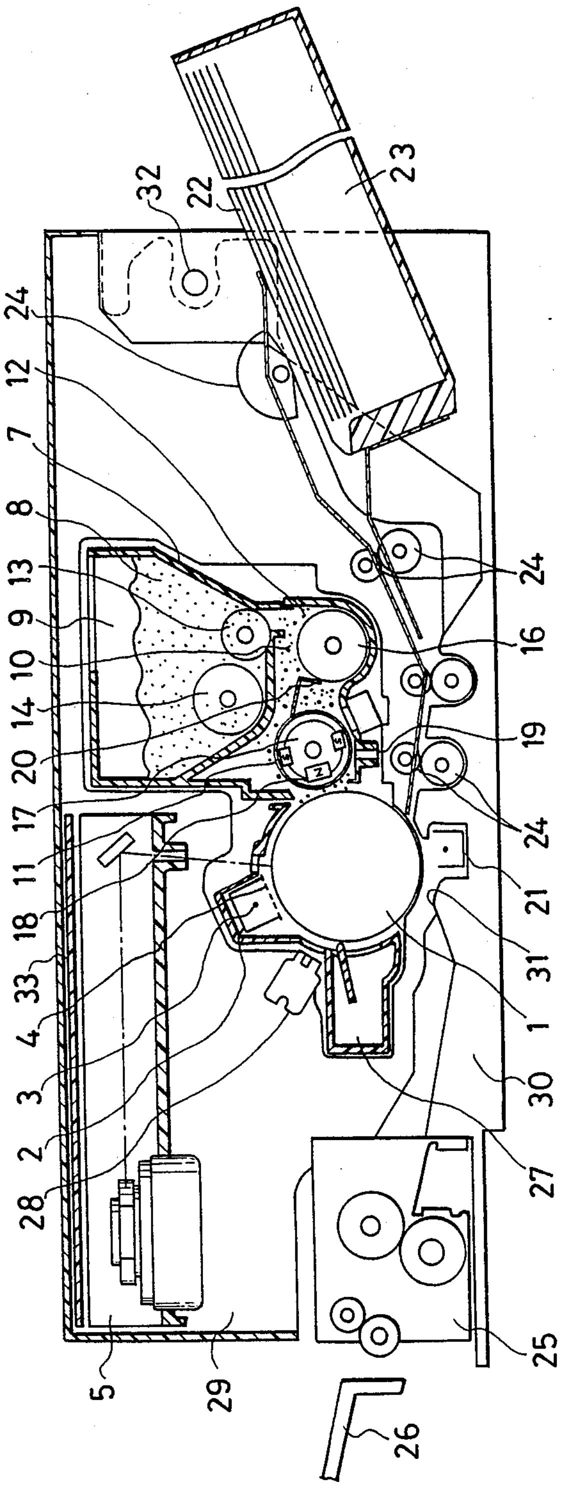
FIG. 5 is an internal side view, partly in cross section, showing general construction of the electrostatographic apparatus.

FIG. 5 is an internal side view, partly in cross section, of the electrostatographic apparatus. A charger 2, which has therein a charging wire 3 made of tungsten and a grid 4, is disposed adjacent to a circumference of a photoconductor 1. High voltage is impressed on the charging wire 3, thereby to induce electric charge on the photoconductor 1. Laser beam which is emitted out of an optical unit 5 flickers by modulation responding to recording signals supplied from a host computer (not shown) and scans the photoconductor, thereby forming electrostatic latent images. The electrostatic latent images are developed by a developer 7. Toner particles 8 are stored in a hopper 9. Carrier particles 10, which is made of e.g. steel, and sleeves 11 are provided to carry the toner particles 8 toward the photoconductor 1. A developing vat 12 generates magnetic brush. A sponge-roller 13 transfers the toner particles 8 from the hopper 9 to the developing vat 12. A paddle 14 stirs the toner particles 8 within the developer 7, thereby to prevent what is called blocking which is caused by a lump of the toner particles 8. The paddle 14 also supplies the toner particles 8 to the sponge-roller 13 and rotates together with the sponge-roller 13, thereby to supply a predetermined amount of the toner particles 8 to the developing vat 12. A mixer 16 mixes the supplied toner particles 8 and the carrier particles 10, and carries the mixed particles onto the sleeve 11. A magnet roller 17 has permanent magnets 18 arranged thereon. The magnetic brush contains the toner particles 8 and the carrier particles 10, which are carried by the mixer 16, and is formed by the permanent magnets 18 like a brush. A trimmer blade 19 limits height of the magnetic brush. The magnetic brush touches the photoconductor 1 and fits the toner particles 8 on the electrostatic latent image formed on the photoconductor 1, thereby forming a powder-like picture image. A scraper 20 removes the toner particles 8 and the carrier particles 10, which are fitted on the sleeve 11, from the sleeve 11 and drops them on the mixer 16 in the developing vat 12. A paper 22, which is stocked in a cassette case 23, is carried to the photoconductor 1 by a carrying roller 24. Since the carrying roller 24 and the photoconductor 1 are driven by the same driving source, they are mutually synchronized to carry the paper 22. The powder-like picture image, which is formed on the photoconductor 1 by impressing high voltage, is transcribed onto the paper 22 by a transcriber 25. The transcribed powder-like picture image is heat-fixed by a fixer 25. The paper 22 whereon the fixed picture image is formed is ejected onto a tray 26. After transcription, a cleaner 27 scrapes the toner 8 remaining on the photoconductor 1. An eraser 28 erases the electric charge remaining on the photoconductor 1. The cleaner 27 and the eraser 28 are provided in order to make a surface of the photoconductor 1 to be the initial state where no toner particles 8 and no electric charge exist on the photoconductor 1.

Figure 6:
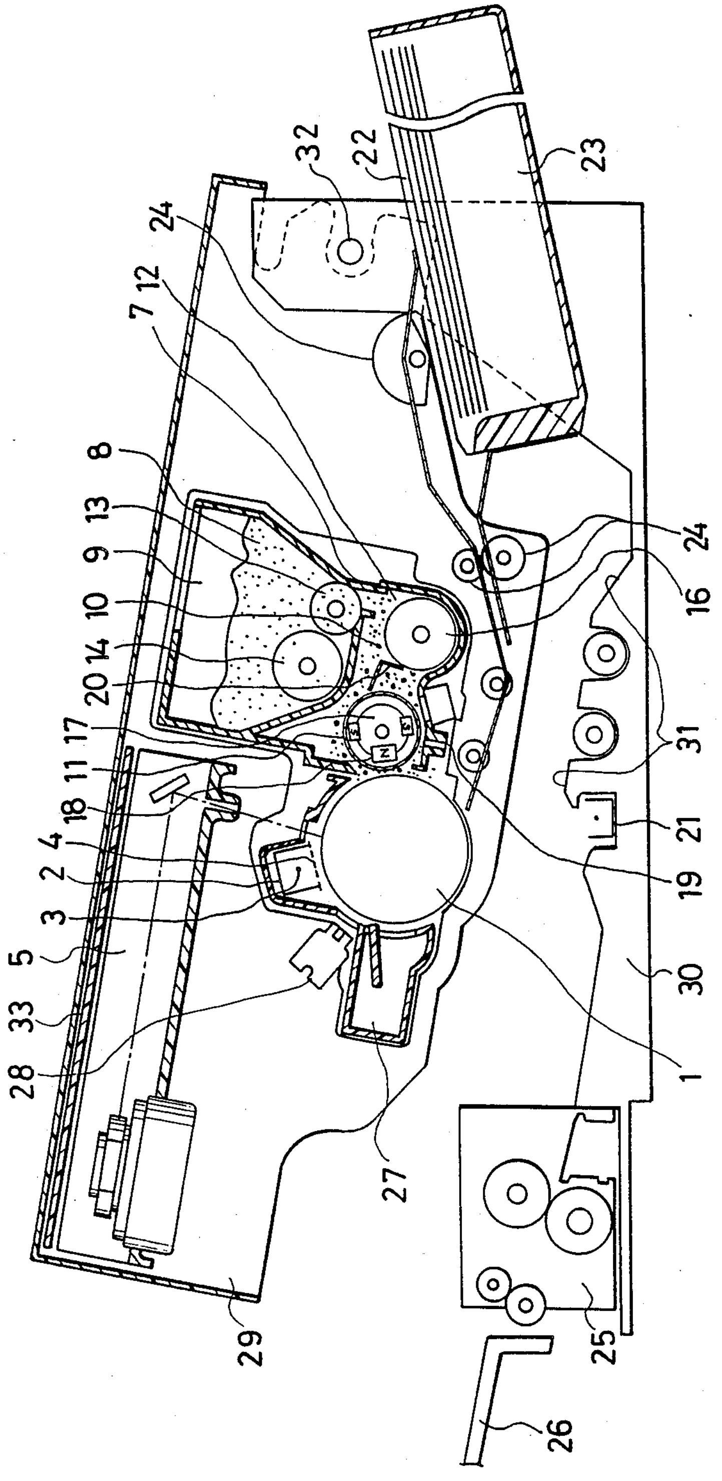
FIG. 6 is an internal side view, partly in cross section, showing general construction of the electrostatographic apparatus in an open state thereof.
Figure 7:
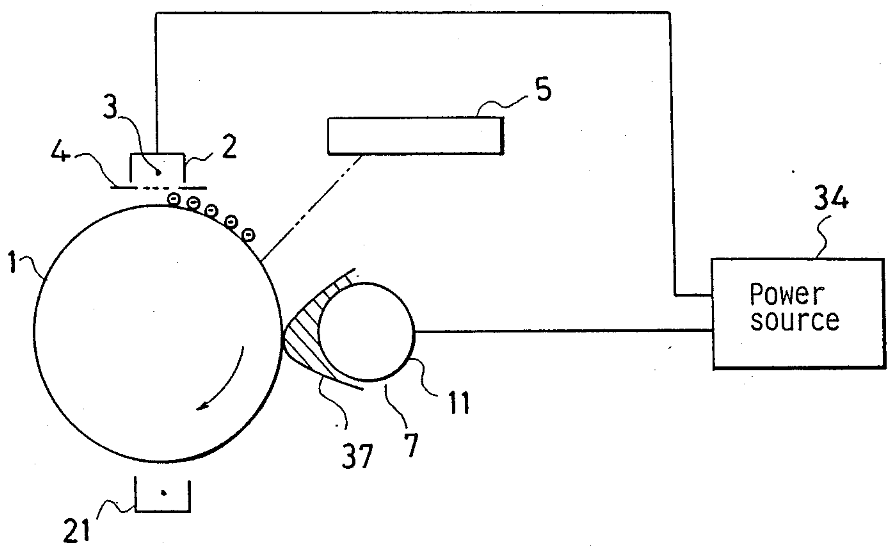
FIG.7 (Prior Art)
FIG. 7 is the block diagram showing the conventional electrostatographic apparatus.
Figure 8:
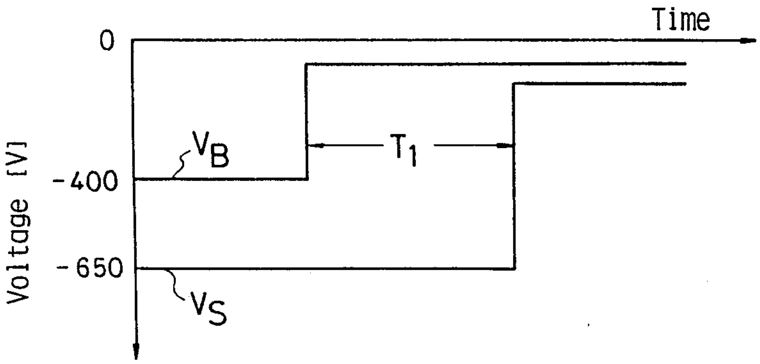
FIG.8 (Prior Art)
FIG. 8 is the graph showing the conventional time charts of potential of the developer 7 and the surface of the photoconductor 1 in FIG. 5.

FIG. 6 is also an internal side view, partly in cross section, of the electrostatographic apparatus in an open state thereof. An upper frame 29 holds the photoconductor 1, the optical unit 5, the charger 2, the developer 7, the cleaner 27 and the eraser 28 etc. thereon. A lower frame 30 holds the fixer 25 etc. A paper guide 31 are provided to guide the paper 22. The upper frame 29 is rotatably held on the lower frame 30 around a shaft 32, thereby to easily take out the paper 22 which causes jam. Control circuit for controlling the optical unit 5, the charger 2, the developer 7, the cleaner 27, the eraser 28 and the fixer 25 etc. is formed on a substrate 33.

Figure 1:
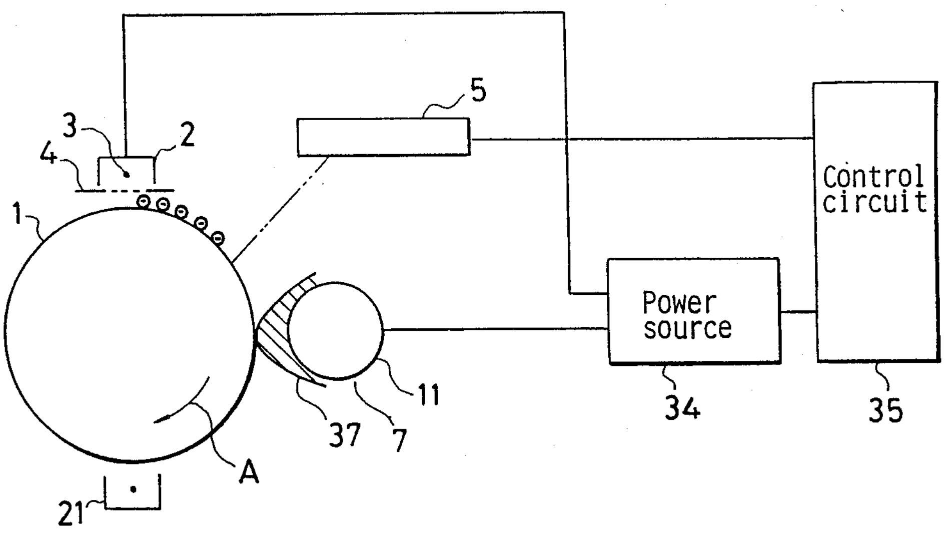
FIG. 1 is a block diagram showing an electrostatographic apparatus of a first embodiment of the present invention.

FIG. 1 is a block diagram showing the above-mentioned electrostatographic apparatus. In the figure, power for the charger 2 and the developer 7 is supplied by a power source 34. It is advantageous for saving cost to commonly use only one power source 34. The magnetic brush 37 is formed within an area shown by slanted lines between the photoconductor 1 and the sleeve 11.

When the paper 22 causes jam somewhere in the carrying means such as the carrying roller 24, a control circuit 35 controls the optical unit 5 and the power source 34 by the following procedure. At first, the power source 34 stops supplying of current at the same time as occurrence of the jam, thereby stopping operations of the charger 2 and the developer 7. The photoconductor 1 maintains to rotate in a direction shown by an arrow A. Until a charged part on the surface of the photoconductor 1, which is faced to the charger 2 at the time of stoppage of power supply to the charger 2, reaches the developer 7, the optical unit 5 is controlled to scan a surface of the photoconductor 1 with the laser beam lit irrespective of the recording signals. After that, the photoconductor 1 and the carrying roller 24 eject the paper 22, which is still under recording, onto the tray 26. Subsequently, the photoconductor 1 and the carrying roller 24 stop rotations thereof.

Figure 2:
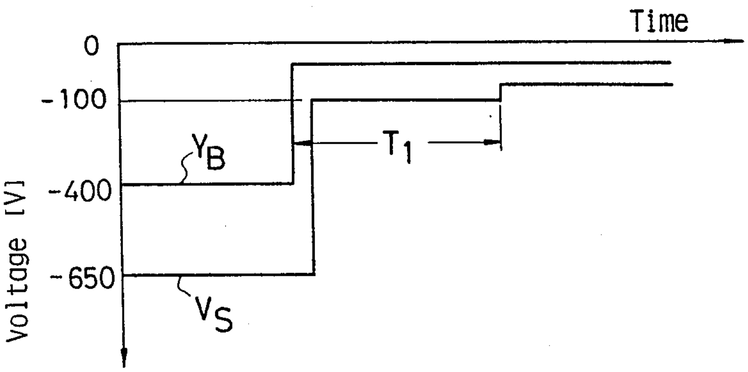
FIG. 2 is a graph showing time charts of potential of a developer 7 and a surface of photoconductor 1 in FIG. 5.

FIG. 2 is a graph showing time charts of potential of the developer 7 and a surface of the photoconductor 1. As mentioned above, since the optical unit 5 maintains to scan the surface of the photoconductor 1 with the laser beam lit during a predetermined time period $T_1$ from the stoppage of power supply to the charger 2 and the developer 7, the potential $V_S$ on the surface of the photoconductor 1 under the developer 7 becomes to a potential which is determined by exposing itself to the laser beam (namely the potential $V_S$ lowers). Therefore, difference between the potential $V_S$ and the potential $V_B$ applied to the developer 7 becomes small. Although there are a small amount of toner particles 8 which are charged with positive potential, they are not attracted to the surface of the photoconductor 1 because the difference of potential is small. Consequently, consumption of the toner particles 8 and excluded amount of the toner particles 8 are kept within predetermined values. Also, scattering of the carrier particles 10 away from the sleeve 11 is prevented. When the predetermined time period $T_1$ lapsed, the potential $V_S$ further lowers slightly because a part on the photoconductor 1, which reaches under the charger 2 after the stoppage of power supply and is thereby not charged, reaches under the developer 7.

Figure 3:
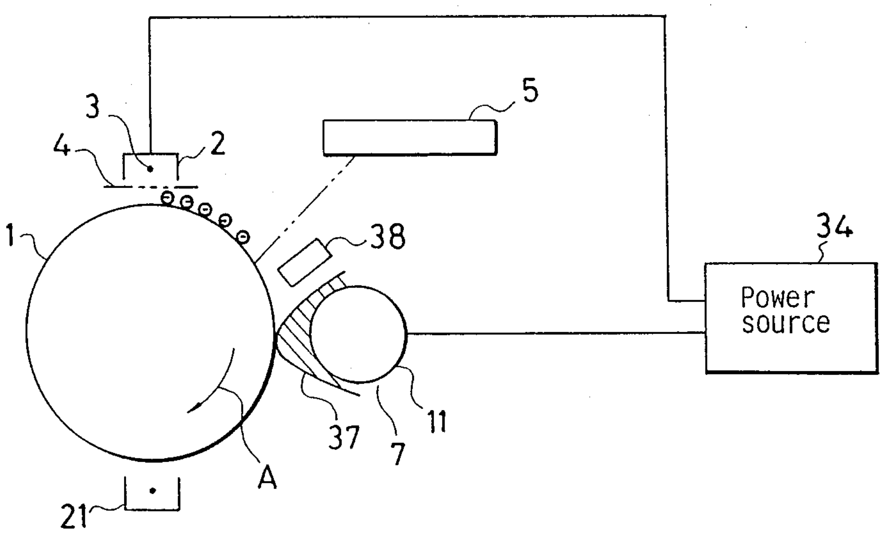
FIG. 3 is a block diagram showing an electrostatographic apparatus of a second embodiment of the present invention.

FIG. 3 is a block diagram showing another embodiment of the present invention. General construction is the same as the first embodiment shown by FIG. 5. Corresponding parts and components to the first embodiment are shown by the same numerals and marks, and the description thereon made in the first embodiment similarly apply. Differences and features of this second embodiment from the first embodiment are as follows.

In FIG. 3, an erasing light source 38 is provided between the charger 2 and the developer 7. When a malfunction such as jam occurs, power supply to the charger 2 and the developer 7 stop simultaneously, whereas the photoconductor 1 keeps on rotating in a direction shown by an arrow A. While a charged part on the surface of the photoconductor 1, which is faced to the charger 2 at the time of stoppage of power supply to the charger 2, reaches the developer 7, namely during a predetermined time period, the erasing light source 38 is emitting light (e.g. non-convergent and non-scanning) onto the surface of the photoconductor 1.

Figure 4:
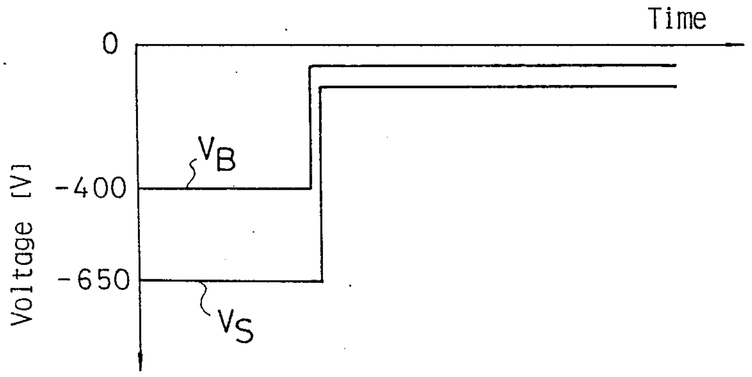
FIG. 4 is a graph showing time charts of potential of the developer 7 and the surface of the photoconductor 1 in FIG. 5.

FIG. 4 is a graph showing time charts of potential of the developer 7 and a surface of the photoconductor 1. As mentioned above, since the erasing light source 38 is emitting light onto the surface of the photoconductor 1 during the predetermined time period from the stoppage of power supply to the charger 2 and the developer 7, the potential $V_S$ on the surface of the photoconductor 1 under the developer 7 becomes to potential which is determined by exposing itself to the light (namely the potential $V_S$ lowers). Therefore, difference between the potential $V_S$ and the potential $V_B$ applied to the developer 7 becomes small. Although there are a few toner particles 8 which are charged with positive potential, they are not attracted to the surface of the photoconductor 1 because of the small difference of potential. Consequently, consumption of the toner particles 8 and excluded amount of the toner particles 8 are kept within predetermined values. Also, scattering of the carrier particles 10 away from the sleeve 11 is prevented.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An electrostatographic apparatus comprising:

a photoconductor;

a charger disposed adjacent to a circumference of said photoconductor;

a laser unit for emitting laser beam to scan a surface of said photoconductor in response to recording signals and forming latent image on said surface which has been charged by said charger;

a developer for developing said latent image;

a power source for supplying power to said charger and said developer; and control means for controlling said laser unit to scan said photoconductor during a predetermined time period with laser beam lit irrespective of said recording signals after stoppage of power supply from said power source to said charger and said developer.

2. An electrostatographic apparatus comprising:

a photoconductor;

a charger disposed adjacent to a circumference of said photoconductor;

a laser unit for emitting laser beam to scan a surface of said photoconductor in response to recording signals and forming latent image on said surface which has been charged by said charger;

a developer for developing said latent image with toner particles;

a power source for supplying power to said charger and said developer; and control means for controlling said laser unit to scan said photoconductor during a predetermined time period with laser beam lit irrespective of said recording signals after stoppage of power supply from said power source to said charger and said developer, said stoppage of power supply being caused by detecting a malfunction of the electrostatographic apparatus.

3. An electrostatographic apparatus comprising:

a photoconductor;

a charger disposed adjacent to a circumference of said photoconductor;

a laser unit for emitting laser beam to scan a surface of said photoconductor in response to recording signals and forming latent image on said surface which has been charged by said charger;

a developer for developing said latent image;

a power source for supplying power to said charger and said developer; and an erasing light source which is provided between said charger and said developer to emit light onto said photoconductor during a predetermined time period after stoppage of power supply from said power source to said charger and said developer.

* * * * *